(12) United States Patent
Gillis et al.

(10) Patent No.: US 9,296,341 B2
(45) Date of Patent: Mar. 29, 2016

(54) TIP OUT STYLE VEHICLE INTERIOR DOOR

(71) Applicant: Ford Global Technologies, LLC, Dearborn, MI (US)

(72) Inventors: Francis Raymond Gillis, Farmington Hills, MI (US); Stephen Jacobsen, Dearborn, MI (US); Francesco DiDato, Allen Park, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 17 days.

(21) Appl. No.: 14/314,716

(22) Filed: Jun. 25, 2014

(65) Prior Publication Data

US 2015/0375684 A1    Dec. 31, 2015

(51) Int. Cl.
*B60R 13/00*   (2006.01)
*B60R 7/04*    (2006.01)

(52) U.S. Cl.
CPC ........................................ *B60R 7/04* (2013.01)

(58) Field of Classification Search
CPC .................................... B60R 7/04; B60R 7/00
See application file for complete search history.

(56) References Cited

U.S. PATENT DOCUMENTS

| | | | | |
|---|---|---|---|---|
| 7,226,102 | B2* | 6/2007 | Yang | B60N 3/08 220/836 |
| 7,717,009 | B2 | 5/2010 | Cho | |
| 8,157,314 | B2* | 4/2012 | Gwon | B60R 1/04 296/1.11 |
| 8,430,358 | B2 | 4/2013 | Schneider et al. | |
| 2001/0052524 | A1 | 12/2001 | Ichimaru et al. | |
| 2013/0112831 | A1* | 5/2013 | Kong | B60N 2/4686 248/311.2 |

* cited by examiner

*Primary Examiner* — Lori L Lyjak
(74) *Attorney, Agent, or Firm* — Vichit Chea Price Heneveld LLP

(57) ABSTRACT

A console assembly includes a console assembly housing with a member disposed within a wall thereof that is rotatable between a plurality of positions. The member includes a passenger accessible feature that is not accessible when the member is in a first, closed position and is accessible when the member is placed in the second, open position. The member includes two member protrusions that engage with corresponding console protrusions such that the member is slidably guided through a plurality of positions. The protrusions may have differing centers of rotation making the member rotate and project simultaneously.

20 Claims, 6 Drawing Sheets

TIP OUT STYLE VEHICLE INTERIOR DOOR

FIELD OF THE INVENTION

The present invention generally relates to a console assembly for use within a vehicle interior, and more particularly, to a console assembly and a member having corresponding protrusions adapted to project the member along the protrusions, thereby providing an axis of rotation that can be external the member.

BACKGROUND OF THE INVENTION

As automotive interior styling progresses, there has been an increased desire for unique and stylish solutions for console assemblies while providing a sufficient amount of passenger accessible features for vehicle occupants. Some passenger accessible features, however, often are not usually aesthetically pleasing to the vehicle occupant. Accordingly, the passenger accessible features, in some instances, are concealed within compartments inside a vehicle cabin making the passenger accessible features only accessible to certain vehicle occupants when the compartment is placed in a specific position. To reach the usable position, the compartment typically rotates and thereby creates gaps between the compartment and the surrounding housing that are visible to vehicle passengers.

SUMMARY OF THE INVENTION

According to one aspect of the present disclosure, a console assembly comprises a console housing having a plurality of surfaces that define a void, wherein two of the surfaces include upper and lower console protrusions. A member is disposed within the void having upper and lower member protrusions on two surfaces that engage with the corresponding console protrusions, the member is configured to slidably rotate along the console and member protrusions between first and second positions about an axis external the member.

According to another aspect of the present disclosure a console assembly comprises first and second console housing surfaces each having first and second console protrusions. A member is disposed between the first and second console housing surfaces and comprises two surfaces having a first member protrusion with a first center of rotation and second member protrusion with a second center of rotation, the first and second member protrusions are configured to move with the corresponding console protrusions between first and second positions.

According to yet another aspect of the present disclosure, a projectable member for a vehicle comprises first and second generally parallel surfaces. The projectable member also includes first and second protrusions having respective first and second centers of rotation disposed on both the first and second surfaces, wherein an axis of rotation is defined by the combination of the first and second centers of rotation. A passenger accessible feature is disposed within one of the plurality of surfaces.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
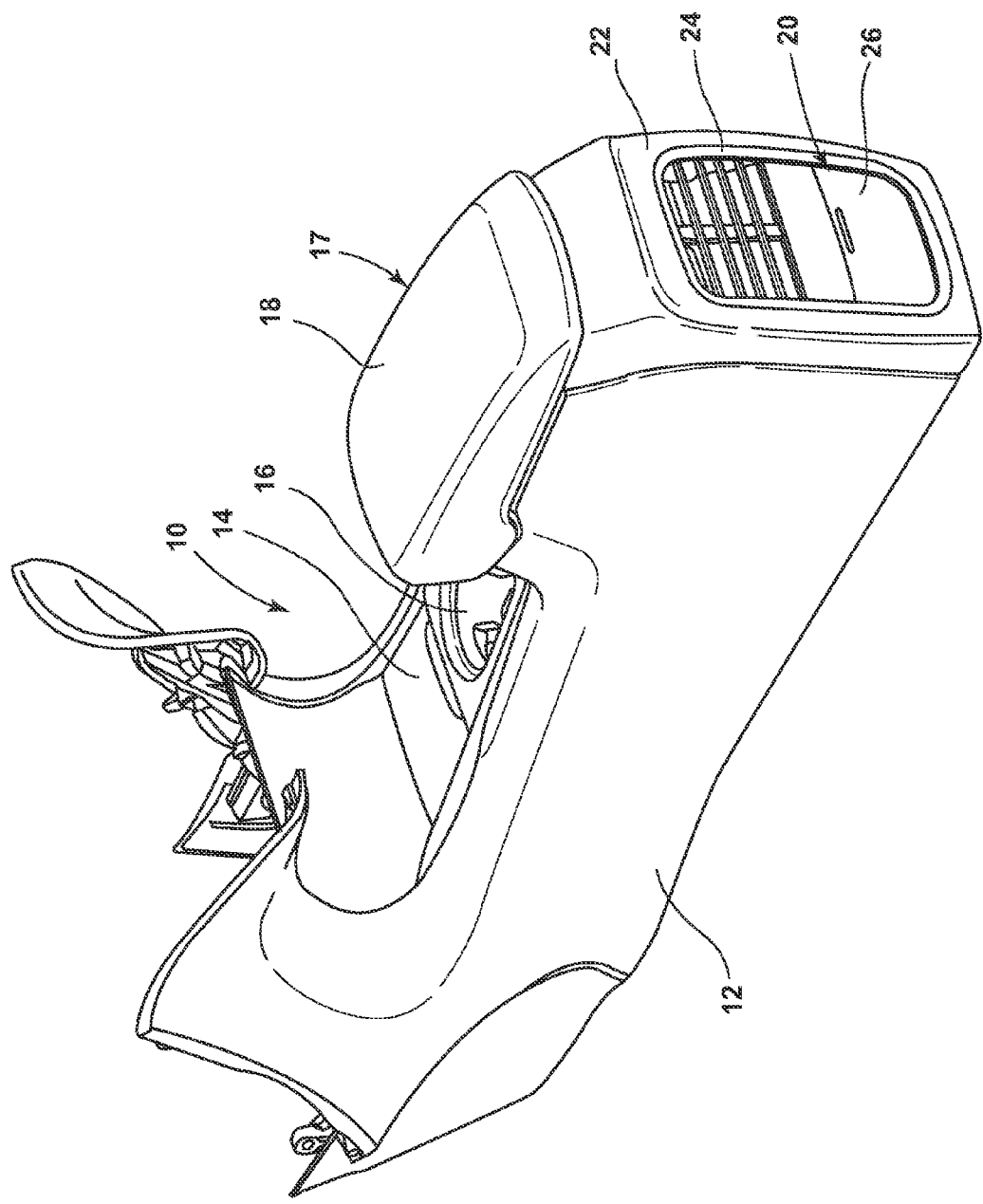
FIG. 1 is a rear perspective view of a vehicle console assembly having a movable member according to an embodiment.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, reference numeral 10 generally designates a console assembly having an outer casing or housing 12. As shown in FIG. 1, the console assembly 10 is in the form of a console assembly 10, which is configured to be disposed within a vehicle passenger compartment interior, generally between the driver and front passenger seats. While a console assembly 10 is illustrated in one embodiment, it is contemplated that any vehicle interior panel may form the housing according to other embodiments. The console assembly 10 generally includes a front console compartment 14 and front cup holders 16. The console assembly 10 further includes a rear console compartment 17 and a rear console compartment cover 18. As shown in FIG. 1, the rear console compartment 17 is in the form of a storage compartment or bin adapted to store or place various items therein. A member 20 is disposed within a rear wall 22 of the console assembly housing 12 and surrounded by a trim piece 24, according to one embodiment. According to other embodiments, the member 20 may be mounted onto any other wall or housing that forms an interior panel of a vehicle, such as the front vertical wall of the console assembly housing 12. The member 20 may be in the form of a door, cover, tray, compartment, housing, or other movable component capable of having a passenger accessible feature or containing a storage compartment disposed within the interior of a vehicle.

Still referring to FIG. 1, the member 20 is movable between a first inward position, wherein the contour of an exterior surface 26 of the member 20 substantially matches that of the surrounding console assembly housing 12 or trim piece 24, and a second outward position, wherein a passenger accessible feature 28 (FIG. 4) is exposed and accessible external the console assembly housing 12. Passenger accessible features 28 (FIG. 4) include electronic ports, passenger controls, storage bins, or any other feature that may be desirable to a passenger whom has access to the member 20 when the member 20 is placed in the second, open position. Additional passenger accessible features and controls may be disposed on the member 20, including, but not limited to, passenger climate control, audio control buttons, rear vehicle occupant heated seats, or any other passenger controlled feature within the vehicle.

Figure 3:
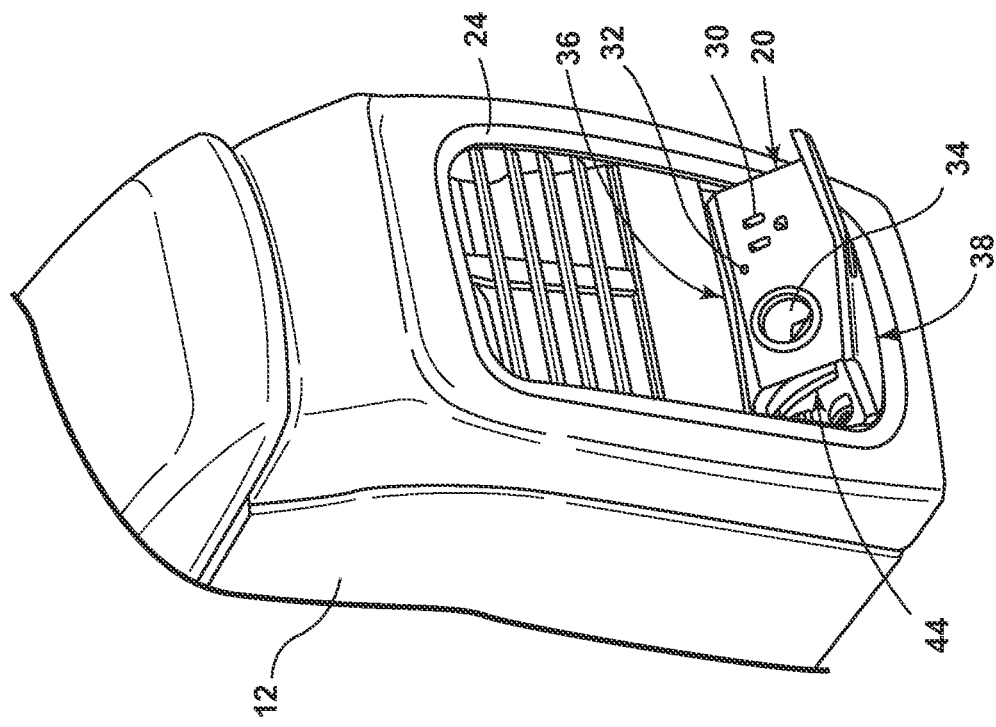
FIG. 3 is an enlarged rear perspective view of the rear portion of the console assembly of FIG. 1 illustrating the movable member in a second outward, open position.
Figure 2:
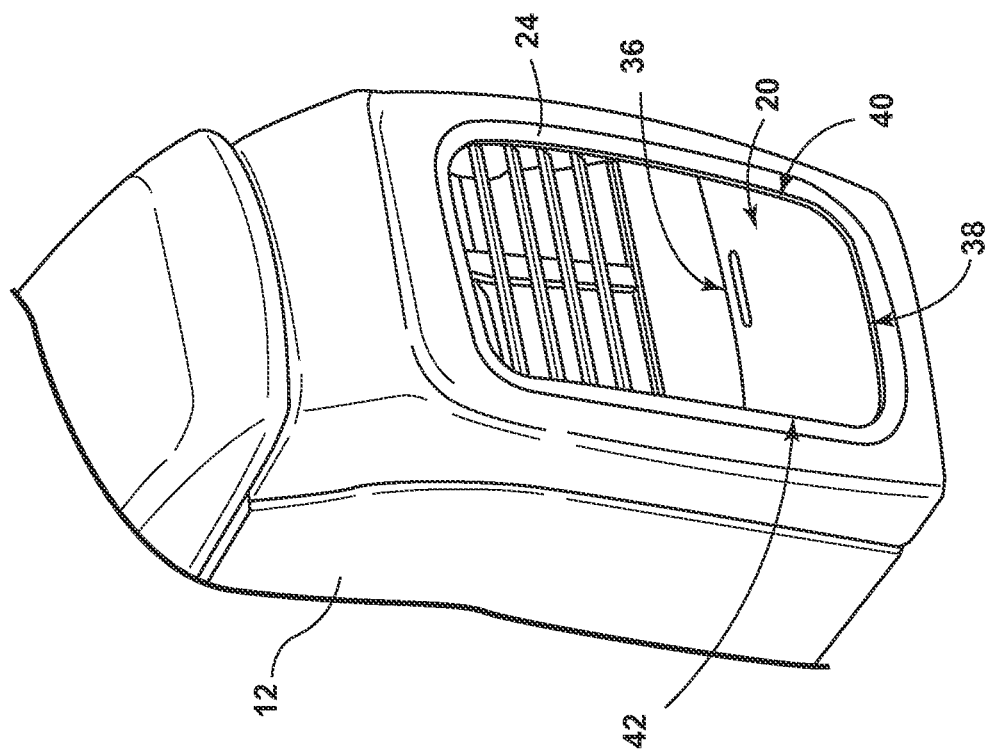
FIG. 2 is an enlarged rear perspective view of the rear portion of the console assembly of FIG. 1 illustrating the movable member disposed within a rear surface of the console assembly and in a first inward position.

Referring to FIGS. 2 and 3, the console assembly housing 12, trim piece 24 and member 20 are shown in the first, closed position (FIG. 2), wherein the passenger accessible features 28 (FIG. 4) disposed on the member 20 are inaccessible and the second, open position (FIG. 3), wherein the passenger accessible features 28, located on member 20, are accessible to passengers. In the illustrated embodiment, the member 20 has passenger accessible features 28 including an alternating current power outlet 30, audio port 32, and 12-volt power outlet 34 disposed on it. The member 20 may be formed from any desirable material, including but not limited to, a plastic material such as Acrylonitrile-butadiene-styrene (ABS), polypropylene (PP), thermoplastic olefin (TPO), stryrene block co-polymer (SEBS), thermoplastic polyurethane (TPU), polyethylene terepthalate (PET), or the like. The console assembly housing 12, in the illustrated embodiment, includes a top surface 36, a bottom surface 38, and two generally parallel side surfaces 40, 42 arranged generally orthogonally to each other to define a generally rectangular receptacle, void, or space for receiving the member 20.

Figure 4:
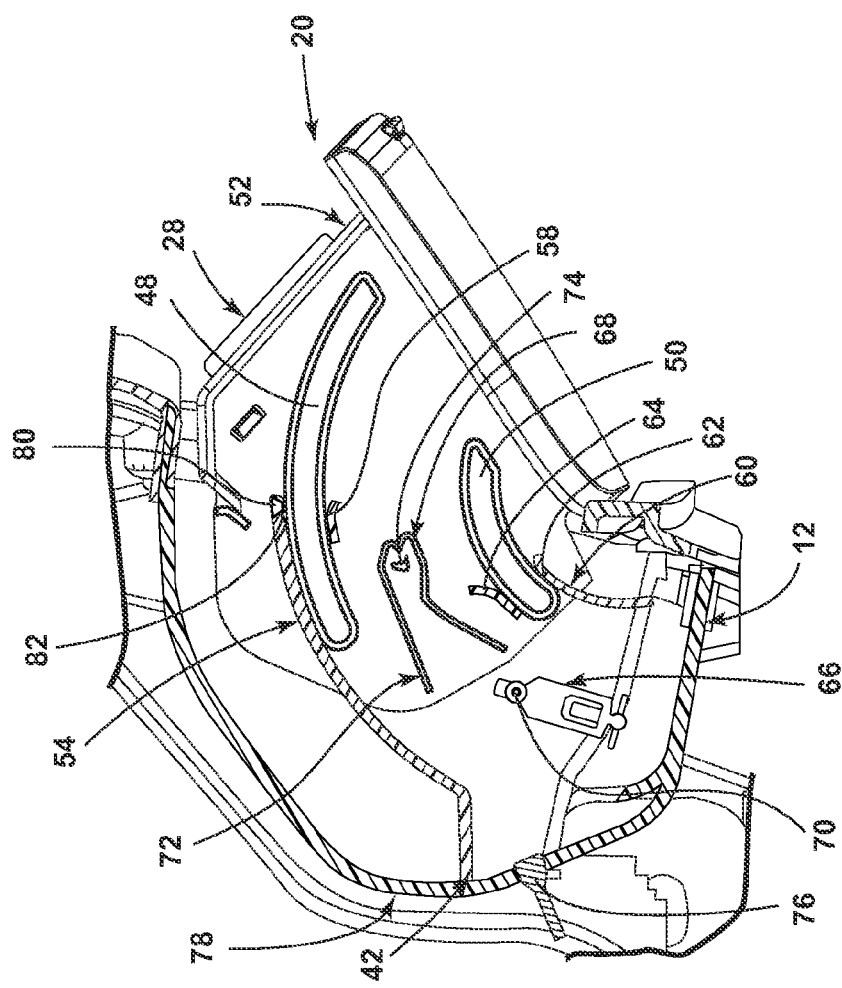
FIG. 4 is an exemplary cross-sectional view of the console assembly of FIG. 2 showing a first side of the member in the inward, closed position.
Figure 5:
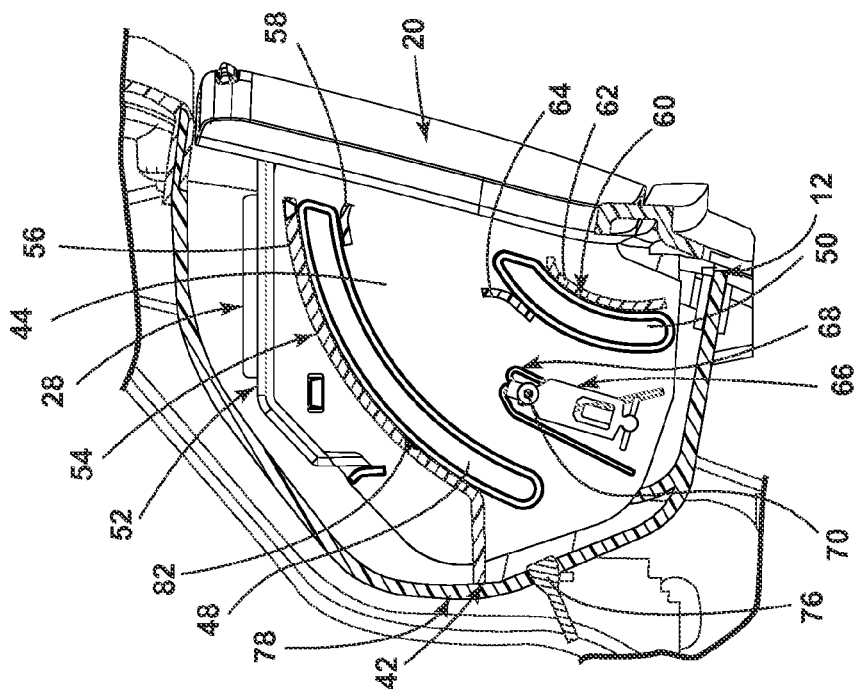
FIG. 5 is an exemplary cross-sectional view of the console assembly of FIG. 3 showing the first side of the member in the outward, open position.
Figures 6, 7:
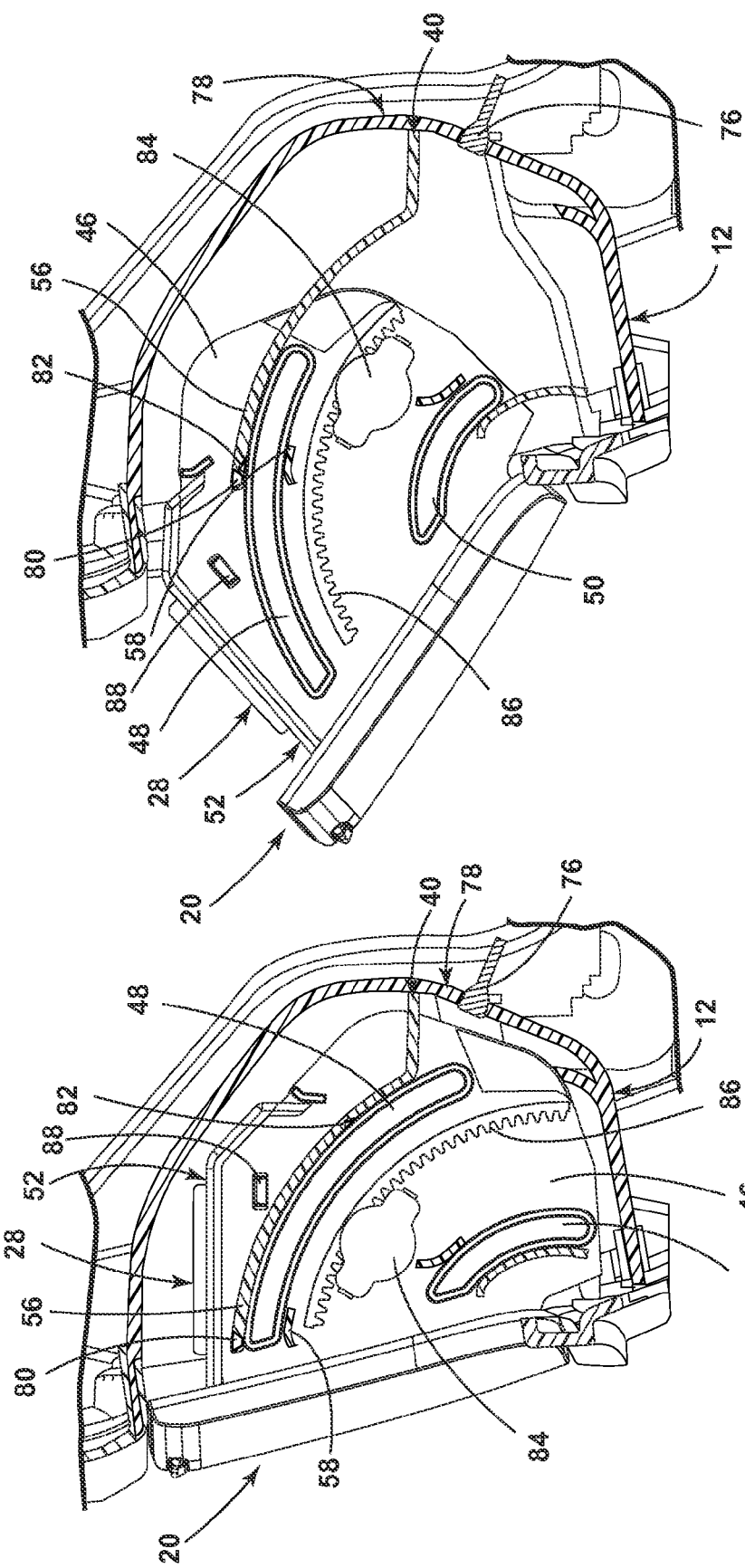
FIG. 6 is an exemplary cross-sectional view of the console assembly of FIG. 2 showing a second side of the member in the inward, closed position.
FIG. 7 is an exemplary cross-sectional view of the console assembly of FIG. 3 showing the second side of the member in the outward, open position.

Referring to FIGS. 4 and 5, a cross-sectional view of a first side surface 44 of the member 20 is shown in a first, closed position (FIG. 4) and a second, open position (FIG. 5). The member 20 may be of any practicable shape and is movably secured, for example through partial encompassment by the console assembly housing 12, to the console assembly housing 12 for moving the member 20 between the plurality of positions. In the illustrated embodiment, the member 20 is defined by a plurality of surfaces, including at least two opposite side surfaces 44, 46 (FIG. 6). The two opposite side surfaces 44, 46 are generally parallel; however, it is contemplated that in additional embodiments the side surfaces 44, 46 need not be parallel. Upper and lower member protrusions 48, 50 extend from each of side surfaces 44, 46 of the member 20. The upper and lower member protrusions 48, 50 may be generally axially aligned to define a pivot axis for the member 20. The member 20 is slidably connected to the console assembly housing 12 about an axis of rotation that may be located externally from the member 20, and possibly external the console assembly 10 (FIG. 1).

The member 20 is tilted outward about a horizontal axis of rotation from a first inward position, shown in FIG. 4, to a second outward position, shown in FIG. 5, through a tilt angle to provide accessibility to a passenger accessible feature 28 located on an upward facing surface 52 of the member 20 external to the console assembly 10, as shown in FIG. 5. The tilt angle may be a function of the area necessary on an upward facing surface 52 of the member 20 for the one or more passenger accessible features 28 and the accessibility to the components on the upward facing surface 52. It is fully contemplated that the tilt angle can vary as long as the upward facing surface 52 of the member 20 accommodates any passenger accessible features 28 to be included on the upward facing surface 52 of the member 20. The range of angle of the member 20 about a horizontal axis of rotation, in the illustrated embodiment, to the second outward position is between about 10 to 40 degrees, according to one embodiment. The range of rotation, however, can be of any practicable amount that would allow for proper usage of the member 20. It is understood that FIGS. 4 and 5 are merely illustrative of one exemplary pivot mechanism. Further, it is also contemplated that the passenger accessible features 28 may be positioned on multiple surfaces of the member 20.

Still referring to FIGS. 4 and 5, on one side surface 44 of the member 20, in the illustrated embodiment, an upper member protrusion 48 is formed to project toward the first inner side wall 42 of the console assembly housing 12. Correspondingly, on a first inner side wall 42 of the console assembly housing 12 an upper console protrusion 54 including upper and lower projections 56, 58 is formed to engage upper and lower surfaces of the upper member protrusion 48 and guide the upper member protrusion 48. Similarly, a lower member protrusion 50 is formed to project toward the first inner side wall 42 of the console assembly housing 12. Respectively, on the first inner side wall 42 of the console assembly housing 12, a lower console protrusion 60 including upper and lower projections 64, 62 is formed to engage upper and lower surfaces of the lower member protrusion 50 and guide the lower member protrusion 50. Accordingly, when the member 20 is moved between the first, closed position and the second, open position, the upper member protrusion 48 is guided along the upper console protrusion 54 and the lower member protrusion 50 is guided along the lower console protrusion 60 to achieve a smooth opening and closing operation of the member 20.

Still referring to FIGS. 4 and 5, in the illustrated embodiment, the upper and lower member protrusions 48, 50 slide within the upper and lower console protrusions 54, 60. However, it is contemplated that the upper and lower console protrusions 54, 60 may be any shape and may conversely be disposed between projections that form upper and lower member protrusions 48, 50 according to other embodiments. In the illustrated embodiment, the upper and lower console protrusions 54, 60 each include an upper projection 56, 64 and a lower projection 58, 62 that are disposed on two opposing sides of the member protrusions 48, 50, respectively. Each pair of upper projections 56, 64 and lower projections 58, 62 are generally continually offset to define a guide for receiving the outwardly extending protrusions 48, 50 from the member 20.

The curvature of the upper console protrusion 54 and corresponding member protrusion 48 may differ from that of the lower console protrusion 60 and corresponding lower member protrusion 50. However, the corresponding upper member protrusion 48 will have a curvature that substantially matches the upper console protrusion 54. Likewise, the lower member protrusion 50 will have a curvature that substantially corresponds to the lower console protrusion 60. Additionally, it is contemplated that additional corresponding protrusions can be added to the console assembly housing 12 and member 20. Each of the additional pairs of corresponding protrusions may have a curvature that is different from that of the first two pairs of protrusions.

In FIG. 4, a retainer clip 66 is connected to a retainer receiving portion 68 on a side surface 44 of the member 20. Retainer clip 66 is attached to the console assembly housing 12. Retainer clip 66 includes a circular portion 70 that is coupled to the retainer receiving portion 68 on the member 20 when the member 20 is assembled to the console assembly housing 12 and placed in the first, closed position. The retainer receiving portion 68, located on the member 20, consists of a clip protrusion 72 having an attainment portion 74 that is specifically designed for releasably coupling to the retainer clip 66. The circular portion 70 of the retainer clip 66 may be guided towards the retainer receiving portion 68 through the use of the clip protrusions 72 that are angled outwardly apart from each other. It is further contemplated that any practicable retainer clip 66 may be used with or instead of the aforementioned retainer clip 66 for maintaining the member 20 in the first, closed position.

Still referring to FIGS. 4 and 5, an absorbing element 76 is operatively connected to a car forward surface 78 of the console assembly housing 12. The absorbing element 76 is configured to absorb noise and vibrations produced by the motion of the member 20. The absorbing element 76 may additionally come in contact with the member 20 when the member 20 is latched into the first, closed position or unlatched so that the member can move to the second, open position. The absorbing element 76 may be composed of felt, viscoelastic materials or any other suitable material. Although the absorbing element 76 is shown as a substantially cylindrical piece, it is contemplated that a piece of any practicable shape and material could be used for the over-travel bumper.

Still referring to FIGS. 4 and 5, in the illustrated embodiment, a downward extending console protrusion detent 80 is located on the upper projection 56 of upper console protrusion 54. Respectively, the upper member protrusion 48 has a member protrusion detent 82 on the upper surface of the upper member protrusion 48. When the console protrusion detent 80 touches the member protrusion detent 82, travel of the member 20 along the track is limited. Accordingly, outward movement of the member 20 relative to the console assembly housing 12 is substantially inhibited once the detents 80, 82 abut one another. In the illustrated embodiment, the console protrusion detent 80 and member protrusion detent 82 arrangement described above is provided on both opposite sides of the console assembly housing 12 and member 20, respectively.

During assembly of the illustrated embodiment, the member 20 is positioned partially into the void of the console assembly housing 12, such that the upper and lower member protrusions 48, 50 are positioned between the upper and lower projections 56, 58 of the upper console protrusion 54 and the upper and lower projections 62, 64 of the lower console protrusion 60. The member is pressed and toward the console assembly housing 12, which causes the member protrusion detent 82 to pass the console protrusion detent 80. Engagement between the retainer receiving portion 68 and the circular portion 70 of the retainer clip 66 provides a hard stop that defines the first, closed position of the bin. Alternatively, the retainer clip 66 may extend from a side 44 of the member 20 and retainer receiving portion 68 may extend inwardly from a first inner side wall 42 of the console assembly housing 12. The detent may alternatively be any practicable mechanism that maintains the rotation angle of the member at the second, open position but still allows for the member 20 to break away from the console assembly housing preventing part breakage when a large amount of force is applied to the member 20.

As illustrated in FIGS. 6 and 7, a damper 84 is operatively connected to the console assembly housing 12 and configured to dampen the motion of the member 20. This may be done by the teeth on the damper 84 engaging with corresponding teeth 86 of the member 20. The teeth 86 located on the member 20 follow a path that substantially matches the curvature of the upper member protrusions 48. However, the path of the teeth 86 on the member 20 can substantially match any protrusion located on the member 20 or the console assembly housing 12. The damper 84 is coupled to the console assembly housing 12 in the illustrated embodiment.

In the illustrated embodiment, the member 20 is biased towards the second, open position so that the second, outward position is a default position; however, the member 20 may be biased towards any direction. The member 20 may be biased by any suitable biasing mechanism. The non-biased position may be maintained through any means known in the art, including a latch. As such, a latch 88 may be added to, or formed with, the member 20 to limit unintended movement of the member 20 between a plurality of positions.

The latch 88 may also be provided inside the console assembly housing 12 to be fitted with a corresponding member latch receiving assembly 90 that is formed near the upper surface 52 of the member 20 when the member 20 is closed, and thus the member 20 is substantially prevented from moving from the first, closed position to the second position without passenger intervention. For example, the latch 90 may be a push-push latch, or any other practicable latch. A member 20 provided with a push-push latch is opened by pushing on the exterior surface 26 of the member 20, which is normally biased in an open direction, and closed by again pushing on the exterior surface 26 of the member 20.

Figure 8:
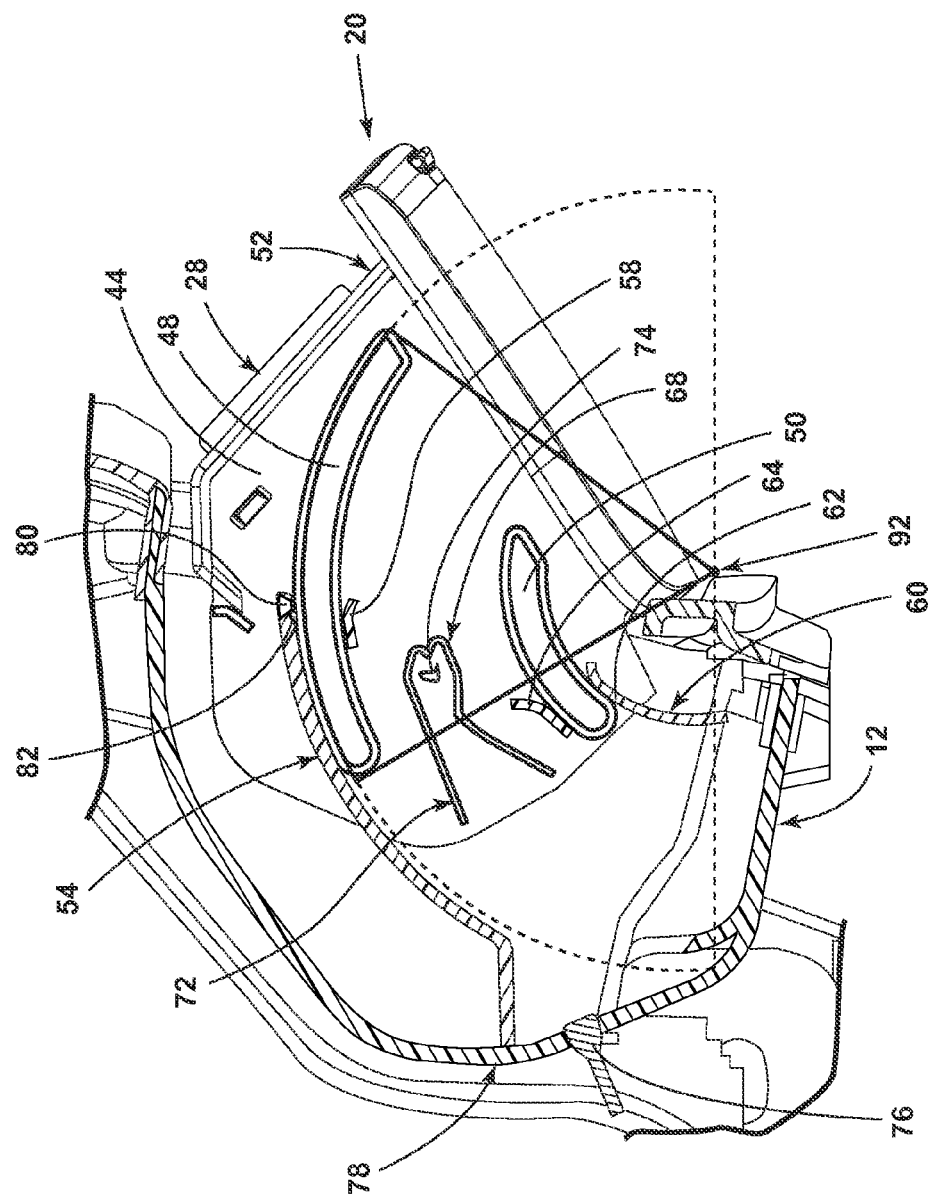
FIG. 8 is an exemplary cross-sectional view of the console assembly of FIG. 3 showing the first side of the member in the outward, open position and the projected center of rotation for a first, upper member protrusion.
Figure 9:
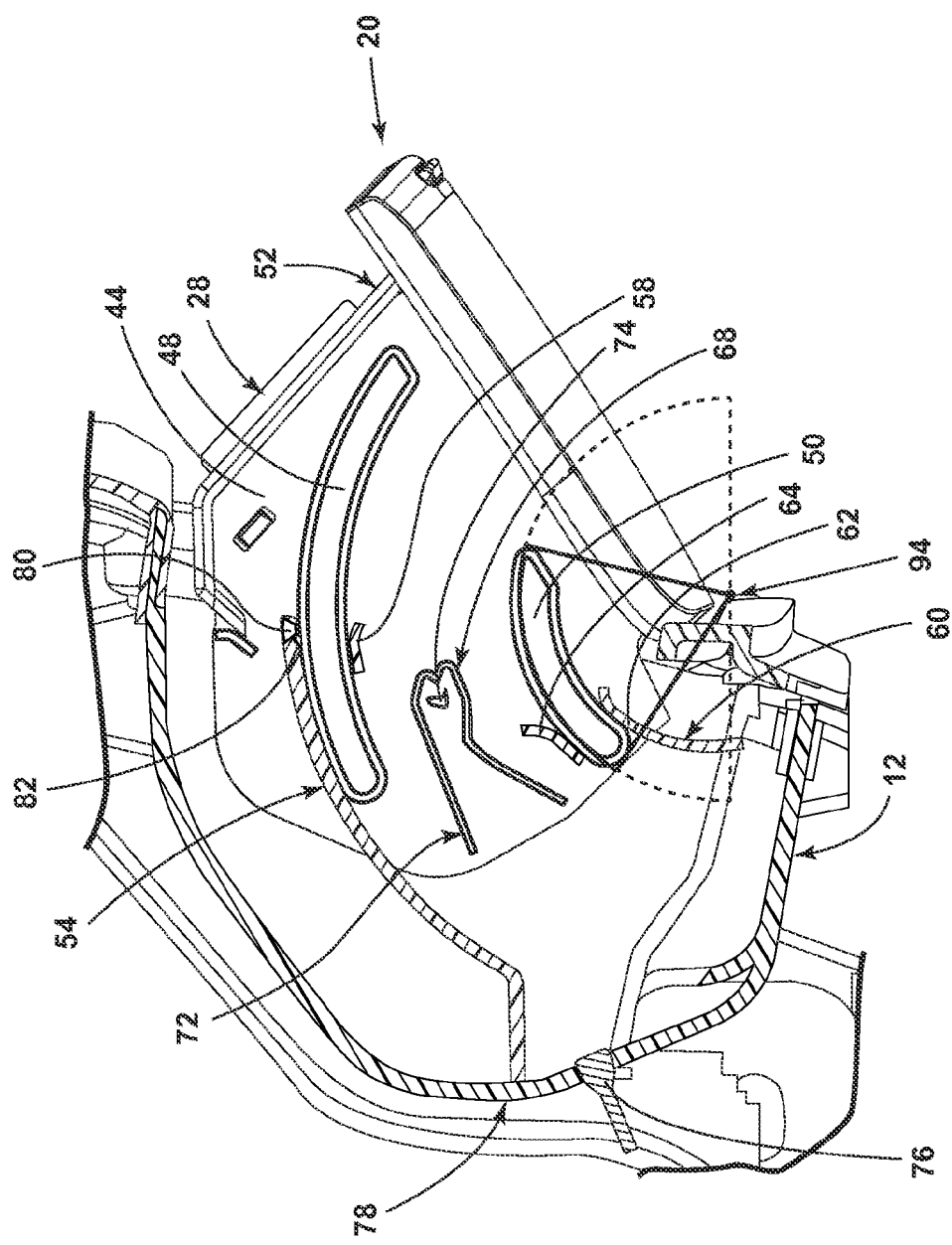
FIG. 9 is an exemplary cross-sectional view of the console assembly of FIG. 3 showing the first side of the member in the outward, open position and the projected center of rotation for a second, lower member protrusion.

Referring to FIGS. 8 and 9, the centers of rotation for the illustrated upper and lower member protrusions 48, 50 are shown. The upper member protrusion 48, in the illustrated embodiment, has a center of rotation 92 located below and external the member 20 (FIG. 8). Similarly, the lower member protrusion 50, in the illustrated embodiment, has a center of rotation 94 that is below and external the member 20. The axis of rotation of the member 20 is determined through the combination of the upper and lower member protrusions 48, 50 respective centers of rotation 92, 94. The movement of the member 20 relative to the console assembly housing 12 between the open and closed positions is guided by the sliding movement of the upper and lower member protrusions 48, 50 within the upper and lower console protrusions 54, 60. However, in different embodiments, the movement of the member 20 relative to the console assembly housing 12 between the open and closed positions may be guided by the sliding movement of upper and lower console protrusions 54, 60 within upper and lower projections created by the member protrusions 48, 50. If the upper corresponding member and console protrusions 48, 54 and lower corresponding member and console protrusions 50, 60 have curvatures having a common center of rotation, the member 20 axis of rotation will be that center of rotation. However, by having at least two different member 20 protrusion centers of rotation, the member 20 can articulate and rotate from a first, closed position to the second, open position simultaneously.

Through the use of two substantially curved arcs, the member 20 can have an axis of rotation that is external the member 20. The axis of rotation may also be external the console assembly 10. If the axis of rotation is external the console assembly 10, then it is possible that the visible surface of the member 20 may move from the first, closed position to the second, open position without having any part of the surface move car forward, or alternatively, from a position external the console assembly 10 to a position within the console assembly 10 void. Thus, through the use of two protrusions on two sides of a member 20 that correspond to two protrusions on two sides of the center console housing 12, the member 20 may project and rotate from a first, closed position to a second, open position to make any passenger accessible features 28 on the member 20 accessible. Further, additional protrusions may be added to make the member rotate, articulate, or rotate and articulate simultaneously. Through the use of the assembly described herein, the void formed at a lower end of a rotated member can be minimized when compared to a fixed pivot axis rotational member. The minimization of the void formed due to rotation of a member can create a perception of higher quality.

Additionally, through the use of assembly described herein, the size of the member 20 may be maximized in relation to the console assembly void when compared to a fixed pivot axis rotational member. The member 20 described herein rotates about a point external the console assembly housing 12. As such, the portions of the member that are located outside of the console assembly in the first, inward position can maintain a position outside the console assembly in the second, outward position. Therefore, the member 20 can have a size that generally matches the size of the console assembly void. Conversely, additional space within the console assembly void is necessary for accommodating portions of a member that rotates car forward when a member has an axis of rotation that is located on the member.

Further, the member 20, according to the present disclosure, may have unique shapes that would be impractical with a fixed pivot axis located on the member 20. A member that would not be able to rotate into the console assembly housing 12 due to console assembly housing 12 design constraints can be overcome with a member 20 that can articulate and rotate simultaneously because the portion of the member 20 exterior the console assembly housing 12 need not rotate into the console assembly housing 12 as the member 20 moves from the first, closed position to the second, open position.

It is also important to note that the construction and arrangement of the elements of the disclosure as shown in the exemplary embodiments are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A console assembly comprising:
a console housing having a plurality of surfaces that define a void, wherein two of the surfaces include upper and lower console protrusions; and
a member disposed within the void having upper and lower member protrusions on two surfaces that engage with the corresponding console protrusions, the member configured to slidably rotate along the console and member protrusions between first and second positions about an axis external the member.

2. The console assembly of claim 1, wherein the upper member protrusions are disposed within the upper console protrusions and the lower member protrusions are disposed within the lower console protrusions.

3. The console assembly of claim 2, wherein the upper console protrusions are disposed within the upper member protrusions and the lower console protrusions are disposed within the lower member protrusions.

4. The console assembly of claim 1, wherein the member further comprises:
a passenger accessible feature disposed within the member that is not accessible when the member is in the first position and is accessible in the second position.

5. The console assembly of claim 4, wherein the passenger accessible feature is an electronic port.

6. The console assembly of claim 4, wherein the passenger accessible feature is a storage compartment.

7. The console assembly of claim 1, further comprising:
a detent on the first or second member protrusion, wherein outward movement of the member protrusion beyond the detent is substantially inhibited.

8. The console assembly of claim 1, further comprising:
a damper connected to the member and the console assembly.

9. The console assembly of claim 1, further comprising:
a latch to maintain the first position of the member.

10. A console assembly comprising:
first and second console housing surfaces each having first and second console protrusions; and
a member disposed between the first and second console housing surfaces and comprising two surfaces having a first member protrusion with a first center of rotation and second member protrusion with a second center of rotation, the first and second member protrusions configured to move with the corresponding console protrusions between first and second positions.

11. The console assembly of claim 10, wherein the member further comprises:
a passenger accessible feature disposed on a surface.

12. The console assembly of claim 10, wherein the combination of the first and second centers of rotation create an axis of rotation that is external the member.

13. The console assembly of claim 10, further comprising:
a detent on the first or second member protrusion, wherein outward movement of the rail beyond the detent is substantially inhibited.

14. The console assembly of claim 10, wherein the member is biased towards one of the first and second positions.

15. The console assembly of claim 14, further comprising:
a latch to maintain the member in the other of the first and second positions.

16. The console assembly of claim 10, further comprising:
a damper connected to the member and one of the console housing surfaces.

17. A projectable member for a vehicle comprising:
first and second generally parallel surfaces;
first and second protrusions having respective first and second centers of rotation disposed on both the first and second surfaces, wherein an axis of rotation is defined by the combination of the first and second centers of rotation; and
a passenger accessible feature disposed within a third surface of the projectable member.

18. The projectable member for a vehicle of claim 17, further comprising:
a latch to maintain the first and second generally parallel surfaces in a default position.

19. The projectable member for a vehicle of claim 17, further comprising:
a toothed protrusion disposed on the first or second surface having a substantially constant offset to the first or second protrusion.

20. The projectable member for a vehicle of claim 17, further comprising:
a damper connected to the first or second generally parallel surface and a console housing.

* * * * *